Dec. 1, 1942.  O. H. BANKER  2,303,975
AUTOMATIC TRANSMISSION
Filed June 26, 1940  3 Sheets-Sheet 1
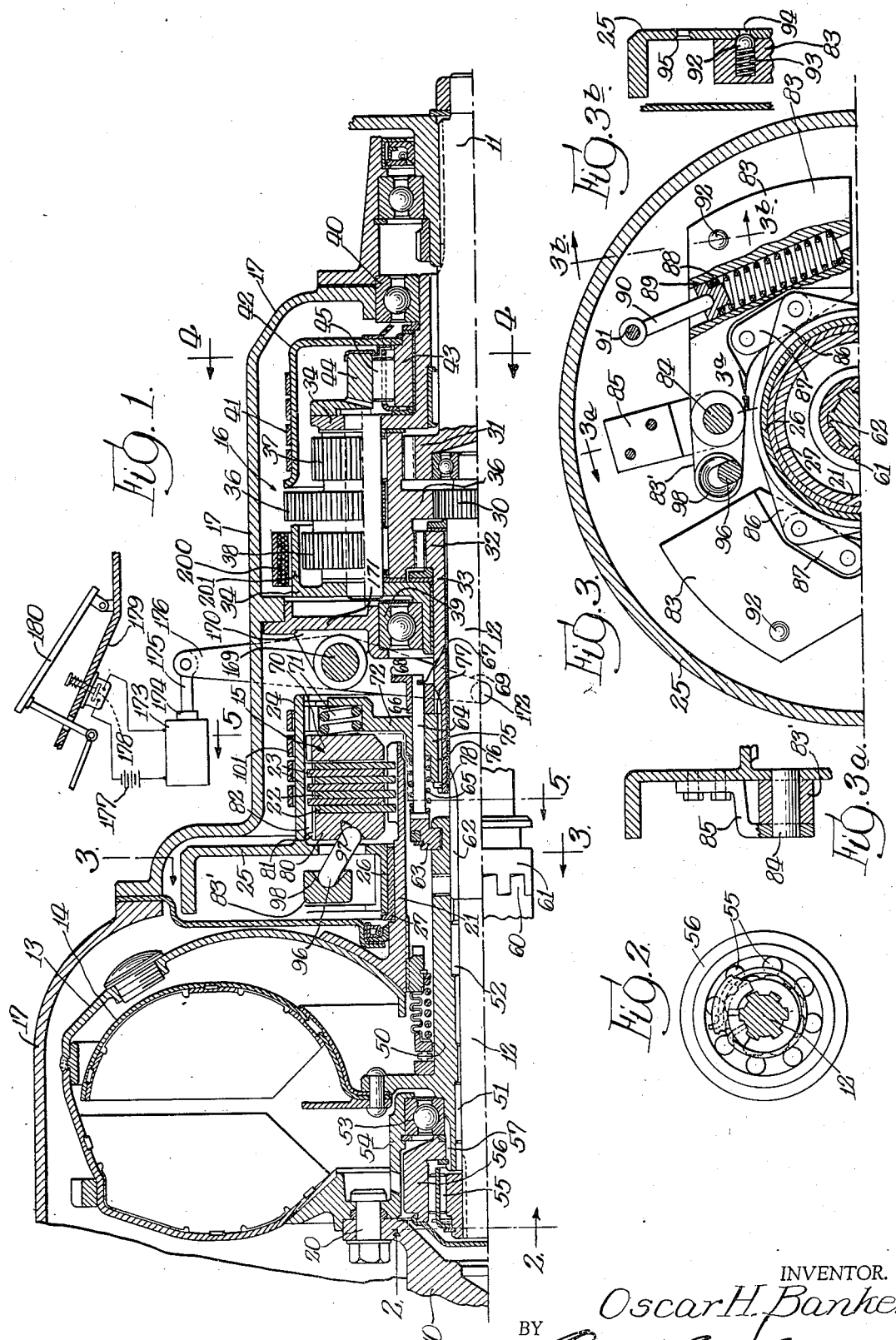
INVENTOR.
Oscar H. Banker,
BY
his Atty.

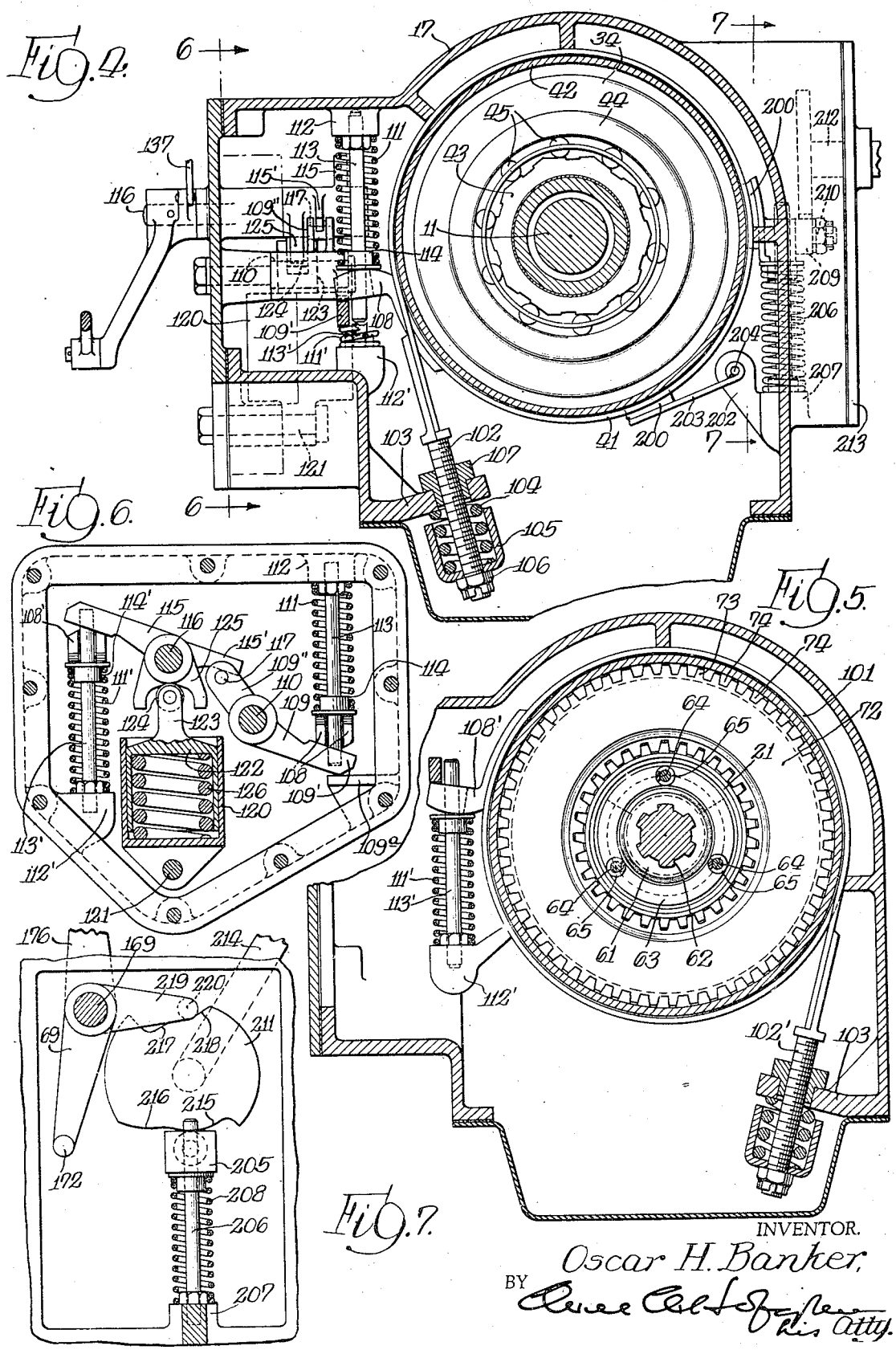

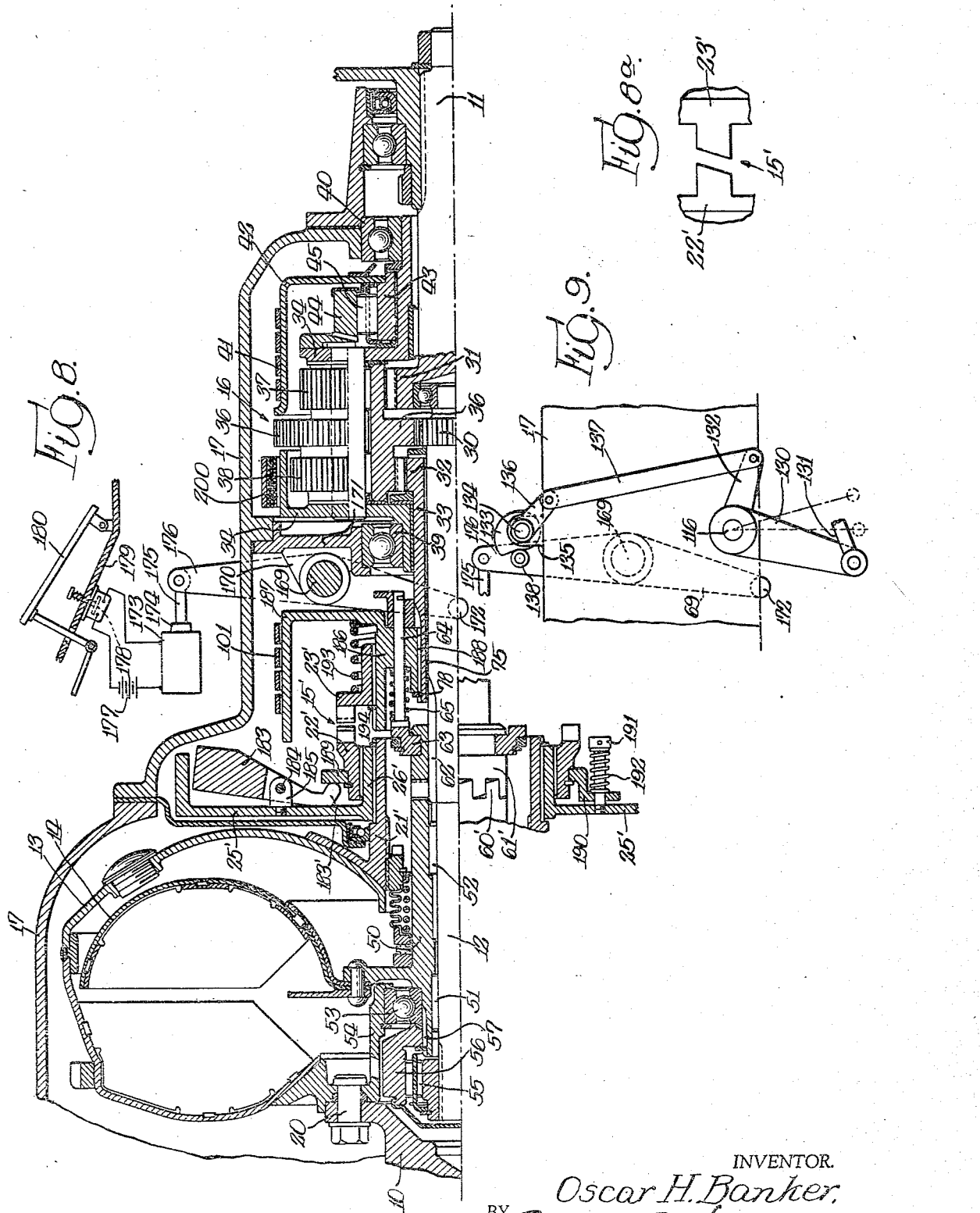

Patented Dec. 1, 1942

2,303,975

UNITED STATES PATENT OFFICE 2,303,975

AUTOMATIC TRANSMISSION

Oscar H. Banker, Chicago, Ill., assignor to New Products Corporation, Chicago, Ill., a corporation of Delaware Application June 26, 1940, Serial No. 342,481

17 Claims. (Cl. 74—260)

This invention relates to a transmission particularly adapted for use in automotive vehicles, it being the general object of the invention to provide a new and improved transmission of this type.

Another object is to provide a new and improved transmission embodying a fluid coupling.

Another object is to provide a transmission embodying a fluid coupling and speed change gearing wherein the fluid coupling is effective in a low speed drive and in direct drive and wherein a second speed drive is obtainable through the gearing without the cushioning effect of the fluid coupling.

Another object is to provide a transmission embodying a fluid coupling and planetary gearing including a low speed drive element and a second speed drive element, and means for establishing a direct drive through the transmission wherein one of said drive elements is driven from the runner of the fluid coupling and the other of said drive elements is driven from the casing thereof.

Another object is to provide a new and improved transmission embodying a fluid coupling, centrifugally operable clutch, and planetary gearing wherein the fluid coupling is effective in a low speed drive and in direct drive to provide a cushioning effect and wherein a second speed drive is obtainable through the centrifugally operable clutch and the gearing and independently of the fluid coupling.

Other objects will become generally apparent from the following detailed description taken in connection with the accompanying drawings, wherein:

Fig. 1 is a fragmentary, longitudinal, central section through a preferred form of the invention.

Fig. 2 is a fragmentary section along the line 2—2 of Fig. 1.

Fig. 3 is a section along the line 3—3 of Fig. 1.

Fig. 3a is a fragmentary section along the line 3a—3a of Fig. 3.

Fig. 3b is a fragmentary section along the line 3b—3b of Fig. 3.

Fig. 4 is a section along the line 4—4 of Fig. 1.

Fig. 5 is a section along the line 5—5 of Fig. 1.

Fig. 6 is a fragmentary section along the line 6—6 of Fig. 4.

Fig. 7 is a section along the line 7—7 of Fig. 4.

Fig. 8 is a fragmentary longitudinal central section through a modified form of the invention.

Fig. 8a is a fragmentary view showing the clutch teeth on the clutch 15'.

Fig. 9 is a fragmentary elevational view looking at the left hand end of Fig. 4.

While there is illustrated in the drawings and hereinafter described in detail a preferred form of the invention, together with a modification thereof, it is to be understood that the invention is not to be limited to the form illustrated, but is intended to cover all modifications and alternative constructions coming within the spirit and scope of the appended claims.

In the form illustrated for purposes of disclosure, the invention is of a type particularly adapted for use in automotive vehicles where it is desired to obtain three speeds of operation, which may hereinafter be referred to as "first" (or "low") speed, "second" (or "intermediate") speed, and a "high" speed (or "direct drive"). As illustrated particularly in Figs. 1 to 5, the invention consists generally of a drive member 10, a driven member 11, an intermediate shaft 12, a fluid coupling having a casing 13 and a runner 14, a centrifugally operable clutch 15 and planetary gearing 16, all enclosed in a housing 17. The drive member 10 may be a part of or attached to the crank shaft or flywheel of the automotive engine and has secured thereto, by means of a plurality of bolts 20, the casing 13 of the fluid coupling. Secured to and extending from the right hand end of the casing 13 is a tubular member 21 which surrounds a portion of the intermediate shaft 12 and at its right hand end carries a plurality of disks 22 forming one of the elements of the centrifugally operable clutch 15. Cooperating disks 23, forming the other element of the clutch 15, are secured to a drum member 24 which is formed integrally with a disk member 25 which in turn has an integral hub 26 rotatably mounted on the tubular member 21 by means of a sleeve bearing 27.

The planetary gearing 16 comprises generally a first or low speed drive gear or element 30 formed on the intermediate shaft 12, a driven gear or element 31 formed on the driven member 11, a second speed drive gear or element 32 formed on a sleeve shaft 33 which surrounds a portion of the intermediate shaft 12, a reaction element or carrier 34 and a plurality of cluster gear elements rotatably mounted on the carrier and each having a gear 36 meshing with the gear 30, a gear 37 meshing with the gear 31, and a gear 38 meshing with the gear 32. The carrier 34 is rotatably mounted in the casing 17 by means of ball bearings 39 and 40. A band brake 41 operable upon a drum 42 is associated with the planetary gear carrier 34, the drum 42 having a hub member 43 secured thereto, between which and an adjacent portion 44 of the planetary carrier is positioned an overrunning clutch 45 (Figs. 1 and 4). This overrunning clutch permits the carrier to overrun the drum when the carrier rotates in a clockwise direction (Fig. 4) and acts to permit the drum (when held by the brake 41) to hold the carrier against counterclockwise rotation.

The runner 14 of the fluid coupling is herein shown as having a sleeve-like supporting member 50 (Fig. 1) which is rotatably mounted on the shaft 12 by means of roller bearings 51 and 52. A ball bearing 53 is interposed between the left hand end of the member 50 and an adjacent portion 54 of the casing 13. A first means for connecting the runner to the shaft 12 consists of an overrunning clutch 55 (Figs. 1 and 2) of conventional construction positioned between the left hand end of the shaft 12 and a collar 56 which is keyed at 57 to the runner supporting member 50. This overrunning clutch, as illustrated in Fig. 2, is arranged to permit the runner to drive the shaft 12 when the runner rotates in a clockwise (or forward) direction when viewed from the left of Fig. 1 and permits the shaft 12 to overrun the runner in the same direction and at a higher speed.

A second means is provided for connecting the runner 14 to the shaft 12. As illustrated herein, the right hand end of the runner supporting member 50 is provided with jaw teeth 60 which are arranged to be engaged with corresponding teeth on a shiftable jaw clutch member 61 which is slidably splined at 62 to the shaft 12 and is shiftable by means of a fork 63 mounted on three rods 64 (Figs. 1 and 5). This clutch member is normally urged into its engaged position, as shown in Fig. 1, by means of coiled springs 65. The ends of the clutch teeth of the jaw clutch members are beveled so as to provide an overrunning jaw type clutch, the parts of which may be engaged when they are synchronized or operated at a common speed. The rods 64 extend through openings in a housing member 72 for the clutch 15 and have a ring 66 secured thereto by means of a lock ring 67. The ring 66 is flanged at 68 and is operable by means of a bifurcated lever 69 mounted on a shaft 169 which is supported on lugs 170 formed on an inner transverse wall 171 of the housing 17. The lower ends of the lever 69 carry pins 172 which are engageable against the flange 68 to disengage the clutch 60, 61 when the lever 69 is swung in a counterclockwise direction from the position shown in Fig. 1. This swinging movement of the clutch lever may be obtained conveniently by means of a solenoid 173 having a movable armature 174 connected by a link 175 to an arm 176 which is secured to the shaft 169. The winding of the solenoid is connected in circuit with a battery 177 and a switch 178 which, when closed, closes the circuit and energizes the solenoid. As illustrated in Fig. 1, the switch 178 is secured to the floor board 179 of an automotive vehicle in a position under the accelerator pedal 180 so that when the accelerator pedal is depressed beyond its full open throttle position the switch 178 is closed and the clutch 60, 61 is disengaged.

The automatic clutch 15 will now be described in more detail with particular reference to Figs. 1 and 3. In addition to the disks 22 which are mounted to rotate with the member 21 and the intermediate disks 23 which are mounted to rotate with the drum 24, the clutch includes a yieldable backing ring 70 which is backed by a plurality of coiled springs 71 positioned between the backing ring and the annular housing member 72. The outer periphery of the ring 70, as well as the outer periphery of the annular member 72, is provided with teeth 73 as shown in Figs. 1 and 5, which teeth are meshed with corresponding teeth 74 on the drum member 24 to provide a driving connection therebetween. The annular member 72 is bored at 75 to fit over the adjacent end of the sleeve 33 to which it is splined at 76 and on which it is held against longitudinal movement by means of a shoulder 77 and a retaining ring 78 on the sleeve. The automatic clutch also includes a pressure ring 80 which has peripheral teeth 81 meshing with corresponding teeth 82 on the interior of the drum 24 so as to provide a driving connection therebetween. The pressure ring 80 is operable by means including a plurality of centrifugally actuated weight members 83 which are pivotally supported on the disk member 25 and brackets 85 bolted thereto (Figs. 3 and 3a). The weight members 83 are preferably connected to move in unison by means of an equalizer ring 86 and links 87 connecting the weight members to the equalizer ring. The weights are arranged to be returned to their innermost positions by means of coil springs 88 (Fig. 3) positioned in bores 89 in the weights and backed by arms 90 pivoted to the disk member 25 on pins 91. Preferably a detent device as illustrated in Fig. 3b is provided to hold the weights yieldably in either their innermost or outermost position. These detent devices comprise spring pressed balls 92 carried in bores 93 on the weight members 83, the balls being engageable in inner recesses 94 or outer recesses 95 in the disk member.

The weight members are connected to operate pressure ring 80 (Fig. 1) by means of struts 96. These struts are positioned with one end in recesses 97 in the pressure ring and their other ends in recesses 98 formed in the inner ends 83' of the weight members 83. It will be readily apparent from Figs. 1 and 3 that upon swinging movement of the weight members outwardly in a counterclockwise direction, as viewed in Fig. 3, the ends 83' of the weight members will swing toward the axis of the transmission and urge the pressure ring 80 toward the right, as viewed in Fig. 1, to engage the clutch 15. Once the weight members have moved outwardly so as to engage the detent balls 92 in the outer recesses 95 the centrifugal clutch will remain engaged even though the speed thereof may drop appreciably below the clutch engaging speed.

In addition to the coil type brake 41 associated with the planetary gearing, a coil type brake 101 (Figs. 1 and 5) is associated with the drum 24 of the automatic clutch 15. These brakes are essentially one way devices, as will be apparent from Figs. 4 and 5, and as hereinafter more fully described, the brake devices 41 and 101 are engaged alternatively.

Referring to Fig. 4, the coil brake 41 is anchored at one end by means of a screw-threaded rod 102 which is secured to one end of the brake band and is yieldably supported in a bracket 103, formed on the casing 17, by means of a coiled spring 104, a cup-shaped member 105, and a nut device 106. Preferably, a bushing 107 is provided on the casing through which the screw-threaded rod 102 is slidable. The other end of the brake band 41 is provided with a bifurcated member 108 (Figs. 4 and 6) and is operable by means including a lever 109 which is pivotally mounted on a control shaft 110. The brake 41 is normally urged toward an expanded or disengaged position by means of a coiled spring 111 which is positioned intermediate the bifurcated member 108 and a boss 112 on the casing 17. A vertical rod 113 is threaded into the boss 112 and has a collar 114 slidably mounted thereon intermediate the lower end of the coiled spring 111 and the member 108. As illustrated in Fig. 6, when the brake 41 is in its disengaged position, the lever 109 is positioned with its right hand end 109' against a bracket 109ᵃ on the casing.

Referring now to Figs. 5 and 6, the brake 101 is anchored at one end by means of a threaded rod 102' and other parts which duplicate the anchoring means for the brake 41 just described are numbered the same but with a ' added. The free end of the brake 101 has the bifurcated member 108' secured thereto, this member being engaged by a lever 115 pivotally mounted on a shaft 116. This brake is also normally urged toward its release or disengaged position by means of a coiled spring 111' which has associated therewith a guide rod 113' threaded into a boss 112' on the casing. The coiled spring 111' is intermediate the boss 112' and a collar 114' which slides on the rod 113 and engages the member 108'.

The control mechanism for the brakes 41 and 101 is so arranged that when one brake is engaged the other is disengaged. This control mechanism as illustrated principally in Fig. 6 includes the levers 109 and 115. The end 109'' of the lever 109 carries a pin 117 which extends under an adjacent part 115' of the lever 115 so that when the lever 115 is moved in a clockwise direction from the position shown in Fig. 6, lever 109 will be pivoted in a counterclockwise direction to engage the brake 41. Movement of the lever 115 in a counterclockwise direction causes engagement of the brake 101 while permitting disengagement of the brake 41 by its associated release spring 111. To assist in the releasing of the brakes and to hold the brakes in their released position, a throw-over device is preferably provided as illustrated in Fig. 6. This consists of a cylinder 120 pivotally mounted on a pin 121 secured to the casing. A piston 122 is slidably mounted in the cylinder and has a rod 123 on which a roller 124 is mounted. The roller engages in a bifurcated portion 125 of the lever 115. A relatively heavy coiled spring 126 is positioned in the cylinder 120 and is operable to urge the piston outwardly thereof. Thus, if the lever 115 is moved in either direction from the position shown in Fig. 6 so that it will be out of this "dead-center" position, the coiled spring 126 is sufficiently strong to rotate the lever 115 to one or the other of its extreme positions, overcoming the effect of the corresponding brake release spring.

As illustrated herein, and more particularly in Fig. 9, the control shaft 116 has a control arm 130 thereon which is arranged to be operated by means of a dash-control knob (not shown) by means of an interconnecting linkage 131. The arm 130 has three positions as indicated, a forward position shown in full lines, a neutral position indicated by a dashed line, and a reverse position indicated by a dot and dash line.

When the control arm 130 is in its neutral or reverse positions, it is necessary to disengage the clutch 60, 61. As illustrated herein, this is accomplished by means of an arm 132 on the shaft 116, a cam 133 secured to a shaft 134 rotatably mounted in upstanding lugs 135 on the housing 17, an arm 136 on the shaft 134 and a link 137 pivotally connected at its opposite ends to the arm 136 and the arm 132. The cam 133 is arranged to cooperate with a roller 138 mounted on the arm 176 and acts to swing the arm 176 in a counterclockwise direction from the position shown in Fig. 9 when the control arm 130 is moved to neutral or reverse positions. It will be apparent that counterclockwise movement of the arm 176 will disengage the clutch member 61 from the clutch member 60. When the control arm 130 is moved to its reverse position the lever 115 operates to engage the brake 101 and to permit release of the brake 41.

In the form illustrated in Fig. 8 the invention is generally similar to that illustrated in Figs. 1 to 3 with the exception that an automatic clutch 15' in Fig. 8 is shown as of the overrunning jaw type, whereas the corresponding automatic clutch 15 of Figs. 1 to 3 is of the friction disk type. As illustrated in Fig. 8 this form of the invention comprises a drive member 10, a driven member 11, an intermediate shaft 12, a fluid coupling having a casing 13 and a runner 14, the centrifugally operable automatic clutch 15' and a planetary gearing 16. The casing 13 of the fluid coupling is secured to the drive member 10 by means of a plurality of bolts 20 and has secured to and extending from its right hand end a tubular member 21' which surrounds a portion of the intermediate shaft 12. Splined on the right hand end of the tubular member 21' is the hub 26' of a disk member 25' on which a plurality of centrifugal weights 183 are pivotally mounted by means of pins 184 and brackets 185. One part 22' of the overrunning jaw type clutch is slidably splined to the hub 26', whereas the other part 23' is slidably splined on a hub 186 of a brake drum 187, said hub in turn being splined at 138 to the tubular member 33 formed integrally with the second speed drive element 32 of the planetary gearing 16. The clutch part 22' carries a ring 189 positioned to be engaged by the inner ends 183' of the weights 183. The ring 189 is preferably provided with a plurality of lugs 190 (preferably three in number), bolts 191 passing through openings in said lugs and into screw-threaded engagement with the disk member 25'. Coiled springs 192 positioned between the lugs 190 and the heads of the bolts 191 serve as return springs for the clutch part 22' and to disengage the clutch and return the weights to the position shown in Fig. 8 when the speed of the parts permit. The clutch part 23' is yieldably backed by means of a coiled spring 193 and is limited in its movement toward the left as shown in Fig. 8 by means of a stop ring 194 secured to the hub 186.

Since the planetary gearing 16 is a duplicate of that shown in Fig. 1 the parts thereof have been numbered to correspond with those of Fig. 1.

In the forms illustrated herein, mechanism is provided for enabling the operator to lock the transmission in a non-free-wheeling second speed drive at will. This mechanism may be operated when the transmission is in "high" to shift the transmission into "second," and to hold the transmission in "second" and prevent free-wheeling until this second speed lock-up mechanism is released manually.

As illustrated in the drawings, this mechanism comprises a band brake 200 which is engageable with a drum 201 formed on the planetary gear carrier 34 (Figs. 1 and 4). The brake band 200 is anchored at one end to a lug 202 (Fig. 4)

integral with the housing 17 by means of an anchoring strap 203 and a pin 204. At its other end the brake band 200 has a block 205 secured thereto which is slidably mounted on a vertical pin 206 (Figs. 4 and 7) anchored at its lower end in a boss 207 on the housing 17. The block 205 is constantly urged upwardly by means of a coiled spring 208 positioned intermediate the block 205 and the boss 207. This action of the spring causes a roller 209, which is rotatably mounted on a bolt 210 extending from the block 205, to engage the periphery of a disk-cam member 211 secured to a short shaft 212 rotatably mounted in a detachable rear wall 213 on the housing 17. The shaft 212 has secured to its outer end a lever 214 which may be operated manually and is preferably secured by a suitable link to a dash-control member (not shown).

The cam member 211 has two oppositely disposed peripheral cam formations, one arranged to actuate the roller 209 to engage the brake band 200 (or permit its release), and the other arranged to rotate the shaft 169 to disengage the overrunning jaw clutch 60, 61. As illustrated in Fig. 7, the cam formation for the roller 209 has a dwell portion 215 and a rising portion 216, whereas the cam formation for disengaging the clutch 60, 61 has a dwell portion 217 and a rising portion 218. The cam formation 217, 218 is arranged to operate the shaft 169 through an arm 219 secured thereto and a pin follower 220 secured to the outer end of said arm. Thus in the position shown in the drawings, the band brake 200 is released, whereas if the lever 214 (Fig. 7) is moved in a counterclockwise direction, the brake band 200 will be engaged and the clutch 60, 61 will be disengaged (or held in disengaged position if previously disengaged). Upon the engagement of the brake band 200 the transmission will be in a positive second speed drive, and free-wheeling through overrunning clutch 45 is prevented, since the carrier 34 is then locked against rotation in both directions.

In the form illustrated in Figs. 1 to 7 and 9, the normal operation consists of moving the manual control lever 130 to its forward position (Fig. 9) whereupon the jaw clutch 60, 61 will become engaged. Upon accelerating the engine by depressing the accelerator 180 (but not far enough to close switch 178), there will be a low speed drive through the fluid coupling, overrunning clutch 55, low speed drive gear 30, and the planetary gearing. The carrier 34 will be held against reverse rotation by the brake 41 and overrunning clutch 45. As the vehicle attains a speed of fifteen miles an hour or more the centrifugally operated friction clutch 15 is automatically engaged whereupon the transmission is shifted automatically to high speed, the planetary carrier then rotating substantially at a common speed with the drive elements 30 and 32. In high speed the fluid coupling is used in the connections for locking the planetary gearing, the casing 13 of the fluid coupling then being connected to the planetary drive element 32 through the automatic clutch 15 and the runner 14 being connected to the planetary drive element 30 through the clutch 60, 61. The fluid coupling thus acts to cushion the high speed drive by locking the drive element 32 yieldably to the drive element 30. To shift from high to second the operator can depress the accelerator pedal to operate the floor switch 178, thus disengaging the jaw clutch 60, 61, and thus continuing the drive of the element 32 through the clutch 15 but leaving the drive element 30 free to rotate at a speed higher than element 32 because of the overrunning clutch 55.

If the operator initially depresses the accelerator pedal to the floor for fast acceleration, the switch 178 is closed to disengage clutch 60, 61 and the automatic shift due to engagement of clutch 15 will be from low speed to second speed. Then if the operator wishes to shift to high, he may do so by decelerating the engine to permit the jaw clutch parts 60, 61 to synchronize and become engaged. During this deceleration there is a reversal of torque in the planetary gearing. Since the second speed gear 32 is mechanically connected to the fluid coupling casing 13, overrunning clutch 45 permits the reaction element 34 to run in a forward direction, with the result that shaft 12 slows down and the clutch 60, 61 engages when the speed of the shaft 12 tends to drop below the speed of the clutch element 60.

If, while operating in high speed or second speed, the operator removes his foot from the accelerator pedal 180 and brakes the vehicle or allows it to coast to a standstill, the clutch 15 will disengage when the speed thereof is sufficiently reduced to enable the springs 88 to swing the weights 83 inwardly. If this stopping of the vehicle occurs while the transmission was in second speed, the clutch 60, 61 would have been disengaged, but upon stopping the vehicle these clutch parts will stop and will be re-engaged by the springs 65, thus conditioning the transmission for subsequent starting of the vehicle in low speed and with normal acceleration.

If while operating in high speed (or second speed) the operator wishes to lock the transmission in second speed and prevent free-wheeling, he may do so by operating the second speed lock-up mechanism by means including the lever 214 (Fig. 7), thus causing engagement of the band brake 200 and disengaging (or holding disengaged) the clutch 60, 61. The transmission will then operate in second speed and will permit the engine to act as a brake on the vehicle during deceleration, until the second speed lock-up lever 214 is returned to the released position as shown in Fig. 7.

The transmission may be placed in neutral by moving the control arm 130 to the dashed line position shown in Fig. 9 whereupon the brakes 41 and 101 will both be disengaged, the shaft 116 and associated parts then being in the position illustrated in Fig. 6. At the same time the cam 133 (Fig. 9) will operate on the arm 176 to disengage the clutch 60, 61. Thus, in neutral no drive can take place through the transmission because the reaction element or carrier 34 is free to rotate in a reverse direction.

By placing the control arm 130 in its reverse position indicated by a dot and dash line in Fig. 9, the shaft 116 is rotated to release the brake 41 and engage the brake 101 and at the same time the cam 133 operates to disengage (or to maintain disengagement of) the clutch 60, 61. Engagement of the brake 101 operates to hold the drive element 32 of the planetary gearing against rotation, thus disabling the centrifugal clutch 15 and effecting a reverse drive through the fluid coupling drive element 30, and the remainder of the planetary gearing, the planetary gear carrier 34 then being free to rotate in a reverse direction.

With the control arm 130 in its reverse position, and the engine of the vehicle is dead, by engaging the second speed lock-up mechanism an operator can park the vehicle on a hill and hold it against movement, since under these conditions the carrier 34 is held by the brake band 200 against movement in a reverse direction.

The operation of the invention in the form illustrated in Fig. 8 is somewhat similar to that just described. However, with this form of the invention is it necessary for the operator to effect a momentary deceleration of the engine and drive member 10 after attaining a shifting speed, in order to permit of the synchronization of the clutch parts 22' and 23'. If the transmission has been accelerating with the jaw clutch 60', 61' engaged, the shift will be from low to high, whereas if the clutch 60', 61' has been in a disengaged position the shift will be from low to second. In the event the clutch 60', 61' has been disengaged during acceleration because of the depression of the accelerator pedal 180 to close the switch 178, the operator may effect a shift from low directly to high by permitting deceleration of the drive member 10 until the clutch parts 60', 61' are also synchronized and engaged.

The controls for effecting forward, neutral and reverse but also a lock-up of the transmission in second speed function the same in this form of the invention as they do in the previous form.

I claim as my invention:

1. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element, a second drive element, a reaction element, a one-way brake for said reaction element arranged to prevent reverse rotation thereof and a brake optionally operative to prevent rotation of the reaction element in both directions, means operable to connect said runner to said first drive element comprising an overrunning one-way clutch and an overrunning jaw type clutch, said fluid coupling being effective at low speed to drive said driven member through said planetary gearing, an automatic clutch operable to connect said drive member to said second drive element, means for engaging said automatic clutch when the speed of the drive member reaches a predetermined value for effecting a second speed drive of said driven member when said overrunning jaw type clutch is disengaged and a high speed drive of the driven member when the overrunning jaw type clutch is engaged, and means for disengaging said overrunning jaw type clutch at will.

2. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element, a second drive element, a reaction element, a one-way brake for said reaction element arranged to prevent reverse rotation thereof and a brake optionally operative to prevent rotation of the reaction element in both directions, means operable to connect said runner to said first drive element comprising an overrunning one-way clutch and a jaw type clutch, said fluid coupling being effective at low speeds to drive said driven member through said planetary gearing, an automatic clutch operable to connect said second drive element to rotate with said drive member, means for engaging said automatic clutch when the speed of the drive member reaches a predetermined value for effecting a second speed drive of said driven member when said jaw type clutch is disengaged and a high speed drive of the driven member when the jaw type clutch is engaged, and means for disengaging said jaw type clutch.

3. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element, a second drive element, a reaction element, a one-way brake for said reaction element arranged to prevent reverse rotation thereof, means operable to connect said runner to said first drive element comprising a first clutch, said fluid coupling being effective at low speeds to drive said driven member through said planetary gearing, an automatic clutch operable to connect said drive member to said second drive element, means for engaging said automatic clutch when the speed of the drive member reaches a predetermined value for effecting a second speed drive of said driven member when said first clutch is disengaged and a high speed drive of the driven member when said first clutch is engaged.

4. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element, a second drive element, a reaction element, a one-way brake for said reaction element arranged to prevent reverse rotation thereof and a brake optionally operative to prevent rotation of the reaction element in both directions, means operable to connect said runner to said first drive element comprising an overrunning one-way clutch and an overrunning jaw type clutch, said fluid coupling being effective at low speeds to drive said driven member through said planetary gearing, an automatic clutch operable to connect said casing to said second drive element, means for engaging said automatic clutch when the speed of the drive member reaches a predetermined value for effecting a second speed drive of said driven member when said overrunning jaw type clutch is disengaged and a high speed drive of the driven member when the overrunning jaw type clutch is engaged, means for disengaging said overrunning jaw type clutch at will, and means operative to effect a reverse rotation of said driven member comprising a brake device operable to hold said second drive element against rotation and means for engaging said brake device and simultaneously releasing said reaction element one-way brake.

5. A transmission having, in combination, a drive member, a driven member, and means for establishing a plurality of driving connections between said members to obtain different speeds of the driven member comprising planetary gearing including a first drive element, a second drive element, a reaction element and a one-way brake for preventing reverse rotation of the reaction element, means including a fluid coupling and an overrunning jaw type clutch in serial relation connecting said drive member to said first drive element, means for connecting said second drive element to rotate with the drive member, a brake optionally operable to prevent rotation of the reaction element in both directions, and means operable to effect disengagement of said overrunning jaw type clutch and to effect application of said last mentioned brake.

6. A transmission having, in combination, a drive member, a driven member, and means for establishing a plurality of driving connections between said members to obtain different speeds of the driven member comprising planetary gearing including a first drive element, a second drive element, a reaction element, a one-way brake for preventing reverse rotation of the reaction element, and a driven element connected to said driven member, means including a fluid coupling and an overrunning jaw type clutch in serial relation connecting said drive member to said first drive element, and an automatic clutch means for connecting said second drive element to rotate with the drive member.

7. A transmission having, in combination, a drive member, a driven member, and means for establishing a plurality of driving connections between said members to obtain different speeds of the driven member comprising planetary gearing including a first drive element, a second drive element, a reaction element and a brake for preventing rotation of the reaction element in a reverse direction, means including a fluid coupling and an overrunning clutch in serial relation connecting said drive member to said first drive element to obtain one of said driving connections, means for connecting said second drive element to rotate with the drive member to obtain another of said driving connections, with said overrunning clutch overrunning, and means engageable to effect a positive two-way drive between the runner of the fluid coupling and said first drive element.

8. A transmission having, in combination, a drive member, a driven member, and means for establishing a plurality of driving connections between said members to obtain different speeds of the driven member comprising planetary gearing including a first drive element, a second drive element, a reaction element and a brake for preventing rotation of the reaction element, means including a fluid coupling and an overrunning jaw type clutch connecting said drive member to said first drive element, an automatic clutch for connecting said second drive element to rotate with the drive member, and means responsive to the speed of the drive member for effecting the operation of said automatic clutch.

9. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element, a second drive element, a reaction element, a brake for said reaction element arranged to prevent reverse rotation thereof, means operable to connect said runner to said first drive element comprising a first clutch, said fluid coupling being effective at low speeds to drive said driven member through said planetary gearing, an automatic clutch operable to connect said drive member to said second drive element, means for engaging said automatic clutch when the speed of the drive member reaches a predetermined value for effecting a second speed drive of said driven member when said first clutch is disengaged and a high speed drive of the driven member when said first clutch is engaged, means for disengaging said first clutch, and means operative optionally to effect a reverse rotation of said driven member comprising a brake device operable to hold said second drive element against rotation and means for engaging said brake device and simultaneously releasing said reaction element brake.

10. A transmission having, in combination, a drive member, a driven member, and means for establishing a plurality of driving connections between said members to obtain different speeds of the driven member comprising a fluid coupling having a casing driven by said drive member and a runner, and gearing, a one-way clutch means operable to render said fluid coupling effective to drive said driven member through said gearing at one speed ratio, a clutch operable to connect said drive member to drive the driven member through said gearing independently of the fluid coupling for effecting a drive of said driven member at a different speed ratio, and means for effecting a two-way drive between said fluid coupling and gearing to obtain a drive of the driven member at a third speed ratio.

11. A transmission having, in combination, a drive member, a driven member, and means for establishing a plurality of driving connections between said members to obtain different speeds of the driven member comprising a fluid coupling having a casing driven by said drive member, and a runner, planetary gearing, clutch means operable when engaged to render said fluid coupling effective to drive said driven member through said planetary gearing at a first speed ratio, an automatic clutch operable to connect said drive member to drive the driven member through said planetary gearing independently of the fluid coupling when the speed of the drive member reaches a predetermined value for effecting a drive of said driven member at a second speed ratio with said clutch means disengaged, means operable to render said last mentioned drive positive, and means optionally operable to engage said clutch means and render the fluid coupling operative jointly with said automatic clutch to drive the driven member at a third speed ratio.

12. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising an overrunning one-way clutch and an overrunning jaw type clutch, said fluid coupling being effective at low speeds to drive said driven member through said planetary gearing, an automatic clutch operable to connect said drive member to said second drive element, means for engaging said automatic clutch when the speed of the drive member reaches a predetermined value for effecting a second speed drive of said driven member when said overrunning jaw type clutch is disengaged and a high speed drive of the driven member when the overrunning jaw type clutch is engaged, and means for disengaging said overrunning jaw type clutch at will.

13. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising an overrunning one-way clutch and a jaw type clutch, an automatic clutch operable to connect said drive member to said second drive element, said fluid coupling being effective at low speeds to drive said driven member through said planetary gearing, means for engaging said automatic clutch when the speed of the drive member reaches a predetermined value for effecting a second speed drive of said driven member when said jaw type clutch is disengaged and a high speed drive of the driven member when the jaw type clutch is engaged, and means for disengaging said jaw type clutch at will.

14. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising an overrunning one-way clutch and a first overrunning jaw type clutch, said fluid coupling being effective at low speeds to drive said driven member through said planetary gearing, an automatic overrunning jaw type clutch operable to connect said drive member to said second drive element, means for engaging said automatic clutch when the speed of the drive member reaches a predetermined value for effecting a second speed drive of said driven member when said first overrunning jaw type clutch is disengaged and a high speed drive of the driven member when the first overrunning jaw type clutch is engaged, and means for disengaging said first overrunning jaw type clutch at will.

15. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising a first overrunning jaw type clutch, said fluid coupling being effective at low speeds to drive said driven member through said planetary gearing, an automatic overrunning jaw type clutch operable to connect said drive member to said second drive element, and means operable to permit engagement of said automatic clutch when the speed of the drive member reaches a predetermined value for effecting a second speed drive of said driven member when said first overrunning jaw type clutch is disengaged and a high speed drive of the driven member when the first overrunning jaw type clutch is engaged.

16. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising a clutch, said fluid coupling being effective at low speeds to drive said driven member through said planetary gearing, a second clutch operable to connect said drive member to said second drive element, means for engaging said second clutch when the speed of the drive member reaches a predetermined value for effecting a second speed drive of said driven member when said first clutch is disengaged and a high speed drive of the driven member when the first clutch is engaged, and means for disengaging said first clutch.

17. A transmission having, in combination, a drive member, a driven member, and means for establishing a plurality of driving connections between said members to obtain different speeds of the driven member comprising a fluid coupling having a casing driven by said drive member and a runner, planetary gearing including a first drive element and a second drive element, means operable to connect said runner to said first drive element comprising a first clutch, said fluid coupling being effective to drive said driven member through said planetary gearing at one gear ratio, a second clutch operable to connect said drive member to said second drive element, means for engaging said second clutch for effecting drive of said driven member at a second speed ratio when said first clutch is disengaged and at a third speed ratio when the first clutch is engaged, and means for operating said first clutch.

OSCAR H. BANKER.